United States Patent [19]

Brennan et al.

[11] Patent Number: 4,658,139
[45] Date of Patent: Apr. 14, 1987

[54] NIGHT VISION REFLEX SIGHT

[75] Inventors: Thomas M. Brennan, Cambridge; W. Michael Glasheen, North Reading, both of Mass.

[73] Assignee: Baird Corporation, Bedford, Mass.

[21] Appl. No.: 697,758

[22] Filed: Feb. 4, 1985

[51] Int. Cl.⁴ .............................................. G02B 27/34
[52] U.S. Cl. .................................. 250/330; 356/251; 33/241
[58] Field of Search ............................ 250/330, 467.1; 356/251; 33/241, 244

[56] References Cited

U.S. PATENT DOCUMENTS

| | | | |
|---|---|---|---|
| 2,837,958 | 6/1958 | Newhouse | 356/251 |
| 2,874,605 | 2/1959 | Williamson | 356/251 |
| 3,315,362 | 4/1967 | Palmer | 33/244 |
| 3,880,529 | 4/1975 | Althause et al. | 356/251 |
| 3,963,356 | 6/1976 | Wiklund | 356/251 |
| 3,994,597 | 11/1976 | Calder et al. | 356/251 |
| 4,168,429 | 9/1979 | Lough | 250/467.1 |
| 4,463,252 | 7/1984 | Brennan et al. | 250/213 VT |

Primary Examiner—Carolyn E. Fields
Attorney, Agent, or Firm—Morse, Altman & Dacey

[57] ABSTRACT

A passive night vision reflex sight with a wide F.O.V. and designed for attachment to a weapon, such as a rifle, is disclosed. The night vision reflex sight preferably is designed for use in combination with a night vision goggle; it can also be used as in daylight without such a goggle, however. When in place, it continues to allow the use of the daytime battle sight of the weapon. The night vision reflex sight comprises a sight for viewing an image of a scene along a line of sight, a photoreceptive sensor aligned with the line of sight and viewing the image, a battery powered red L.E.D., together with a reticle, a lens, and a filter for generating a pulsed or d.c. light and for directing it at the reflex sight, with the sight reflecting the pulsed or d.c. light into the photoreceptive sensor and superimposing it on the image. Preferably, the reticle is adjustable, the pulsed light is pulsed at a rate between about two to about twelve c.p.s. Preferably, the reflex sight is disposed within a housing baffled toward the front, and a demountable flared light shield having a flexible shutter is provided on the housing toward the rear. Preferably, the brightness of the pulsed light is adjustable.

4 Claims, 5 Drawing Figures

NIGHT VISION REFLEX SIGHT

BACKGROUND OF THE INVENTION

1. Field of the Invention

The present invention relates generally to night vision reflex sights and, more particularly, to a passive night vision reflex sight designed for attachment to a weapon and for use in combination with a night vision goggle.

2. The Prior Art

Presently, there are two known methods for accurately aiming an individually fired weapon, such as a rifle, at a target during the night. One involves the boresightedly mounting of a narrow field of view (F.O.V.) monocular night vision goggle on the weapon itself. The narrow field of view (usually 15° or less) is required to provide accuracy of aim. The narrow F.O.V. makes the target acquisition difficult, however. This is doubly so during fast moving battle conditions. The second known method involves the combination of a head-mounted night vision goggle with an infrared aiming light boresightedly attached to the weapon. This facilitates target acquisition. The infrared aiming light is detectable by enemy night vision goggles, however, inviting hostile fire to the source.

SUMMARY OF THE INVENTION

It is a principal object of the present invention to overcome the above disadvantages by providing a passive night vision reflex sight with a wide F.O.V. and designed for attachment to an individually fired weapon.

More specifically, it is an object of the present invention to provide a passive night vision reflex sight with a wide F.O.V., preferably for use in combination with a night vision goggle system, for accurately aiming a weapon, such as a rifle, during low light level conditions. The passive night vision reflex sight comprises a reflex sight for forming an image of a scene along a line of sight, a photoreceptive sensor, which can be a human eye or a night vision goggle, aligned with the line of sight and viewing the image, means for generating a pulsed or direct current light and for directing it at the reflex sight, with the reflex sight reflecting the pulsed light into the photoreceptive sensor and superimposing it on the image of the scene. Preferably, the means for generating the pulsed light and for directing it at the reflex sight includes a battery powered red L.E.D., an adjustable reticle, a collimator lens, and a removeable filter for nighttime operation. A demountable flared light shield having a flexible shutter serves as an interface between the reflex sight and the photoreceptive sensor.

Other objects of the present invention will in part be obvious and will in part appear hereinafter.

The invention accordingly comprises the passive night vision reflex sight of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
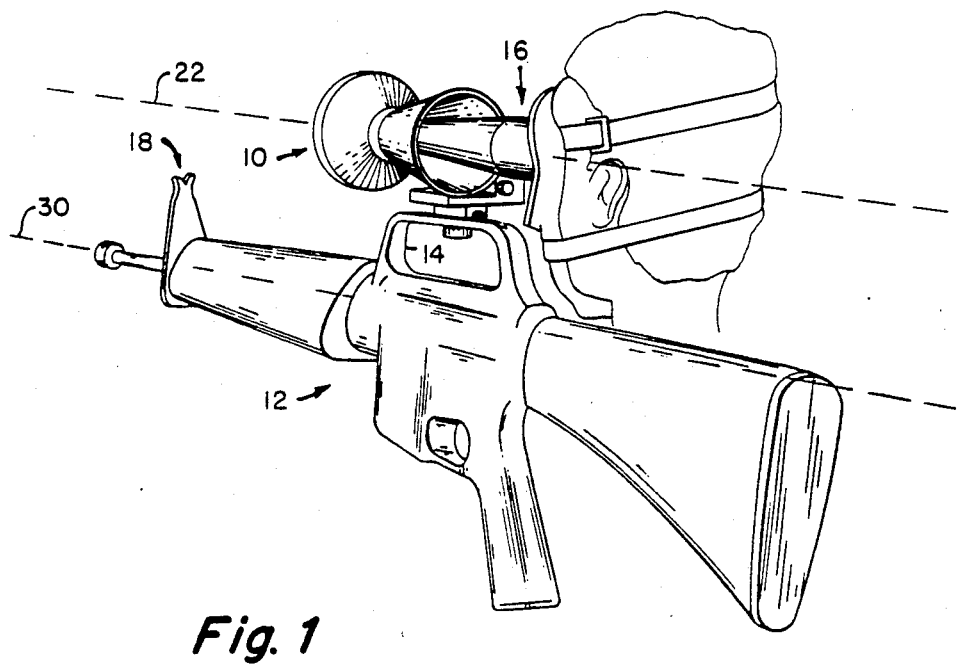
FIG. 1 is a perspective view of a weapon provided with a passive night vision reflex sight constructed in accordance with the present invention, together with a head-mounted night vision goggle of a user.

In general, the illustrated embodiment of a passive night vision reflex sight 10, designed for accurately aiming an individually fired weapon 12 during low light level conditions, is shown mounted to a handle 14 thereof in FIG. 1. (The term "passive"—as opposed to "active"—is intended to define a night vision reflex sight which emits no radiation during its use detectable by an image intensifier equipment. Thus, it presents no detectable target to an enemy sniper. Rather, it provides covert aiming capability to a user during night operations.)

The passive night vision reflex sight 10 of the invention, furthermore, is of a wide field of view (F.O.V.) type, which usually and herein is defined as a F.O.V. of about 40°. Such a wide F.O.V. greatly facilitates target acquisition, an important attribute during rapidly changing nighttime battle conditions. Preferably, the passive night vision reflex sight 10 of the invention is designed for use in combination with a head-mounted night vision goggles system 16. One such preferred head-mounted night vision goggle system is disclosed in an U.S. patent application Ser. No. 337,023, filed Jan. 4, 1982, entitled NIGHT VISION GOGGLE SYSTEM, now U.S. Pat. No. 4,463,252, granted July 31, 1984 and assigned to a common assignee, the Baird Corporation of Bedford, Mass., the disclosure of which is incorporated herein by reference. Night vision goggle systems are biocular viewers that operate at low light levels to allow the user to see, move and perform some tasks, including map reading, light repair and vehicular driving, in the dark. It is pointed out, however, that the passive night vision reflex sight 10 of the invention also can be used to advantage during daylight conditions withut employing any image intensifier equipment at all. This aspect of the invention will be more evident from below. It also is pointed out that the passive night vision reflex sight 10 of the invention, even when mounted to the weapon 12, illustrated as an M-16 rifle, does not interfere with but rather allows the continued use of the conventional daytime battle sight 18 of the weapon 12. Consequently, once mounted in place, the passive night vision reflex sight 10 need not be removed with the rising of the sun above the horizon. The weight of the passive weight vision reflex sight 10, about 600 grams, also presents small incentive for removing the sight 10 from the weapon 12.

Figure 2:
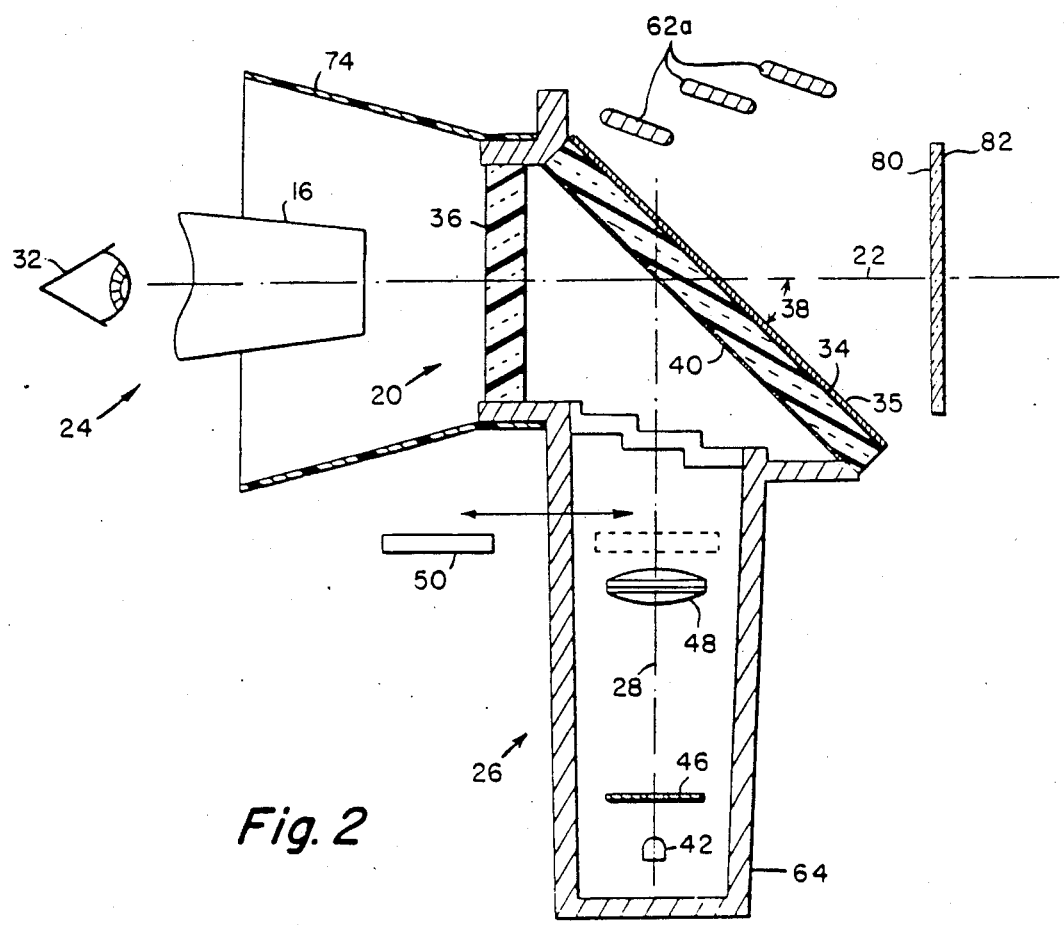
FIG. 2 is a schematic view of the passive night vision reflex sight illustrated in FIG. 1.

As schematically illustrated in FIG. 2, the passive night vision reflex sight 10 essentially comprises a reflex sight 20 for passing an image of a scene along a line of sight 22, a photoreceptive sensor 24 aligned with the line of sight 22, and means 26 for generating a pulsed or direct current (d.c.) light 28 and for directing the pulsed or d.c. light 28 at the reflex sight 20. The reflex sight 20 is designed to reflect the pulsed or d.c. light 28 into the photoreceptive sensor 24 along the line of sight 22, superimposing thereby the pulsed or d.c. light 28 on the image of the scene. The mounting of the passive night vision reflex sight 10 onto the handle 14 of the weapon 12 is so designed that, once properly in place as shown in FIG. 1, the line of sight 22 almost parallels the boresight 30 of the weapon 12, with a slight built-in angle so as to intersect the boresight 30 at about three hundred yards in front of the weapon 12. Preferably, a further window 80 also is mounted, at a slight tilt downward so as to help to reduce any potential reflections from the viewed scene back out into the scene. It is the function of the reflected pulsed or d.c. light 28, as superimposed on the formed image of the scene and viewed by the photoreceptive sensor 24 along the line of sight 22, to spotlight to the photoreceptive sensor 24 the exact spot at which the weapon 12 is aimed.

As mentioned, the photoreceptive sensor 24 can comprise either a human eye 32 or the head-mounted night vision goggle system 16. In practice, the user will move closer to the passive night vision reflex sight 10 with the goggles 16 than as illustrated in FIG. 1 and as will be more apparent from below.

Figure 5:
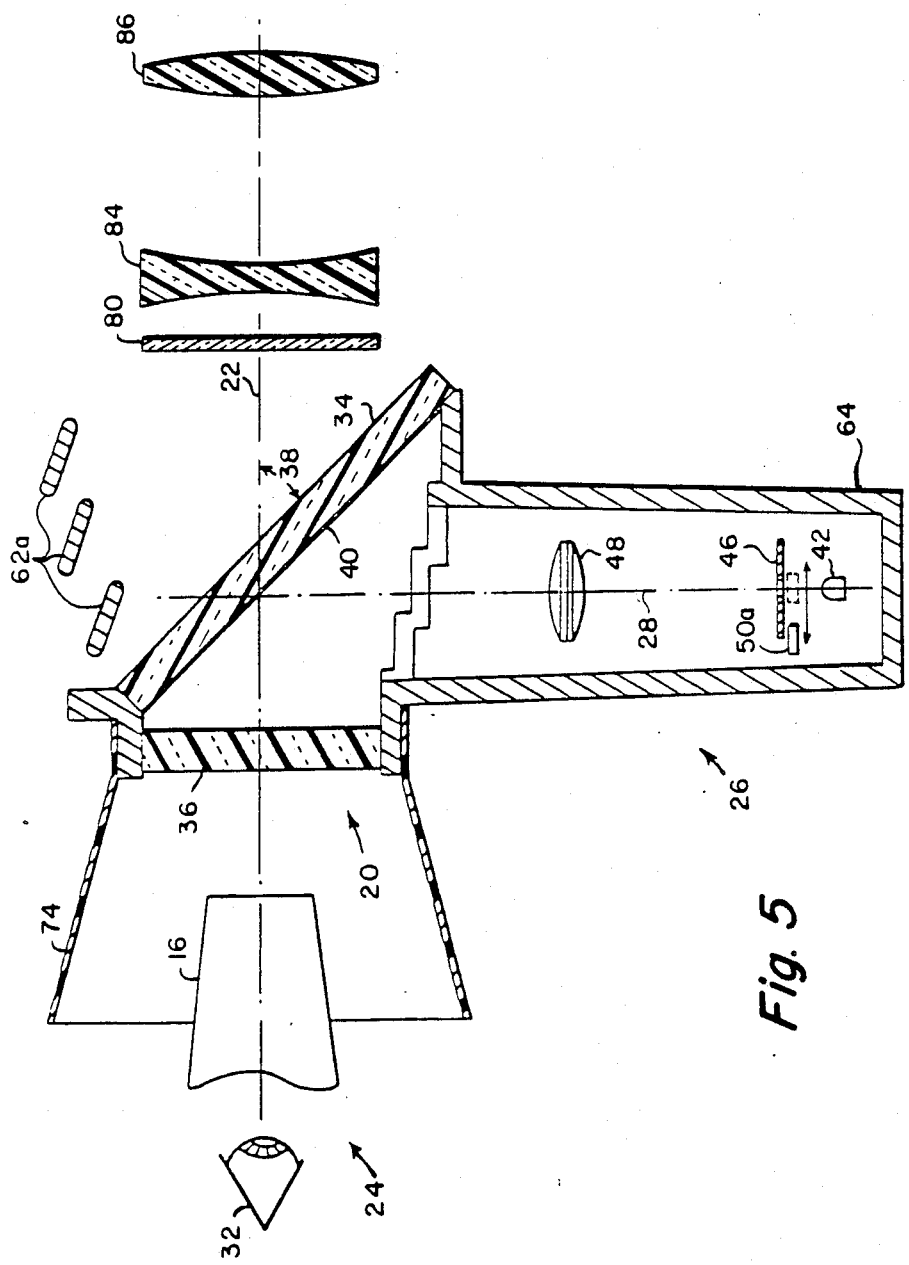
FIG. 5 is a view similar to FIG. 2 but showing a modification thereof.

The reflex sight 20 proper of the passive night vision reflex sight 10 essentially comprises an entrance window 34 and an exit window 36. The entrance window 34 is mounted at an angle 38 with respect to the line of sight 22. Preferably, this angle 36 is about 45°, as shown in FIG. 2. The exit window 36, is mounted normal to the line of sight 22. Both the entrance window 34 and the exit window 36 as well as the further window 80 preferably are formed of glass, such as BK-7, K-5 or any kind of hard crown glass, the latter preferably provided with antireflective coatings 35 and 82, respectively. In the alternative, both windows 34 and 36 also can be formed of optical quality transparent plastic material, such as made from methyl methacrylate and commonly known by the trademark PLEXIGLAS. In order to ensure that all of the pulsed or d.c. light 28 is reflected by the entrance window 34 into the photoreceptive sensor 24, preferably a thin reflective film 40 is formed on the side of the entrance window 34 facing the exit window 36. This reflective film 40 preferably is of a dielectric type so as to make it wavelength selectable and being optically matched to the particular wavelength of the L.E.D. Source 42 so as to reflect only the L.E.D. pulsed or d.c. light 28. The reflex sight 20 preferably is a unity power sight so as to key its weight to a minium i.e., there is no magnification involved when forming the image of the viewed scene. Any desired magnification preferably is effected by employing an appropriate night vision goggle. If magnification of about two to fourfold is desired, the same can be effected by providing a magnification system including a negative lens 84 and a positive lens 86 either before the reflex sight 20, as shown in FIG. 5, or between the reflex sigh 20 and the photoreceptive sensor 24.

Figure 3:
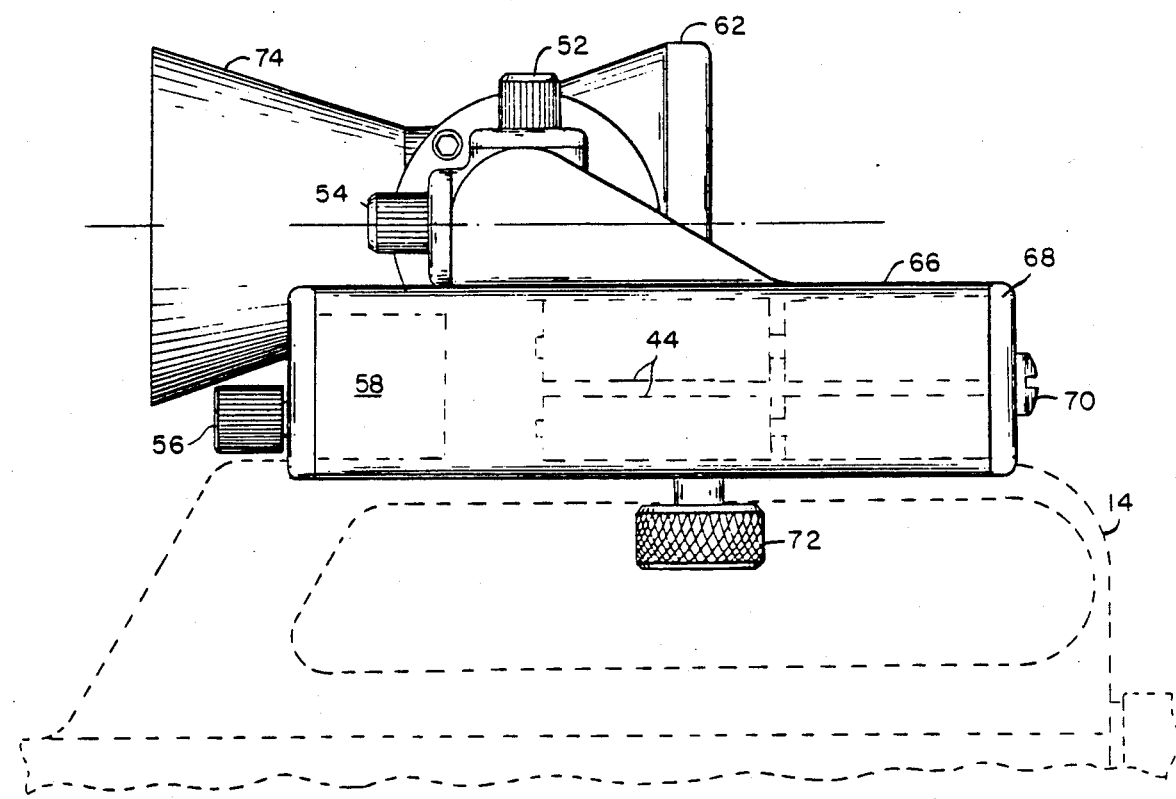
FIG. 3 is a side elevation of the passive night vision reflex sight illustrated in FIG. 1 but on an enlarged scale.
Figure 4:
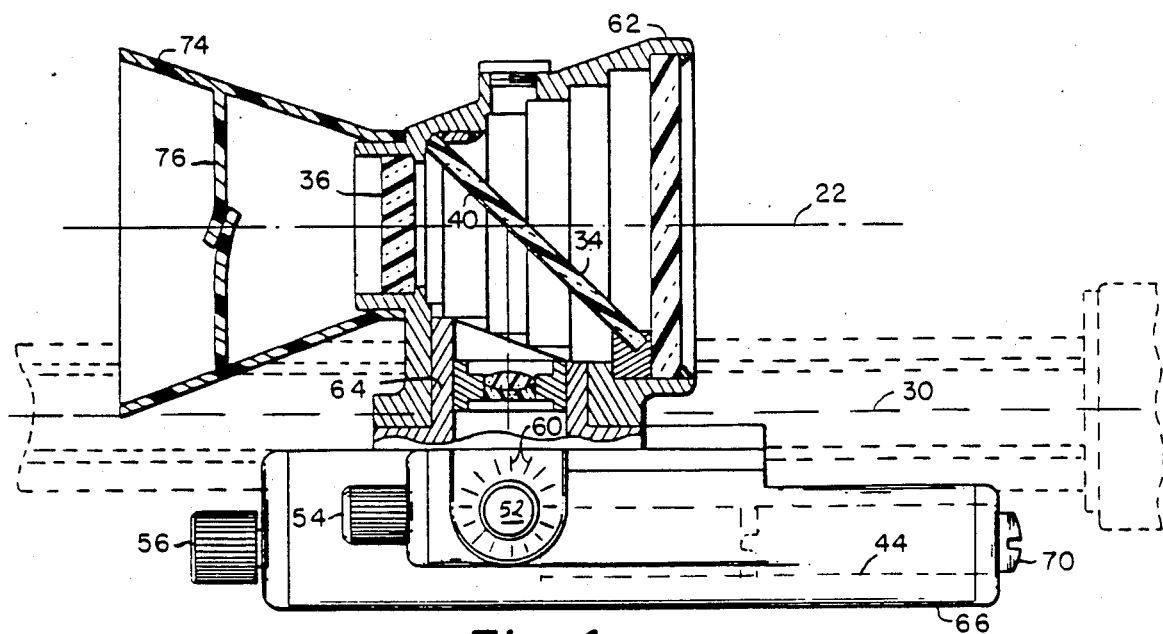
FIG. 4 is a plan view, partly in section, of the night vision reflex sight of FIG. 3.

The means 26 for generating the pulsed light 28 and for directing it at the entrance window 34 of the reflex sight 20, more specifically, on the side of the entrance window 34, provided with the thin reflective film 40, essentially comprises a light emitting diode (L.E.D.) 42, a source of power 44 (note FIGS. 3 and 4) for pulsing the L.E.D. 42, an adjustable reticle 46, a collimator lens 48, and a movable filter 50 for day or night levels. In the alternative, a movable filter 50a of a smaller size can be positioned in front of the reticle 46, as indicated in FIG. 5. Preferably, the L.E.D. 42 is a red L.E.D. so that the pulsed or d.c. light 28 generated thereby will be clearly visible even by the naked eye 32 during daylight operation of the device. This daylight operation capability further is enhanced by the selective use of the movable filter 50, namely the filter 50 only is used for low light level conditions prevailing during the night. For most applications, a collimator lens 48 built as a doublet will suffice in projecting a pulsed or d.c. light 28 of sufficient size to serve as the aim point for the rifleman using the weapon 12, with the passive night vision reflex sight 10 and a goggle system 16 like the one described in said U.S. application Ser. No. 337,023. For other applications, where it is desired to have a larger size aim point, the collimator lens 48 is of the more complex multielement type. The larger is to be the desired aim point, the more complex is the multielement lens. Preferably, the reticle 46 is of a size to be fitted with an aimpoint or cross hair. In the alternative, the reticle 46 also can have a stadiametric rangefinder. In either case, zeroing capability for the generated pulsed light 28 is provided by two adjustment knobs 52 and 54, note FIGS. 3 and 4. Preferably, the source of power 44 is a battery pack that can comprise up to four batteries. Preferably, the pulsed light 28 is pulsed at a rate between about two to about twelve cycles per second (c.p.s), with an optimum rate of about 5 c.p.s. Preferably, the brightness of the generated pulsed light 28 is adjustable between a high level and a low level by a knob 56, which is used, in conjunction with an appropriate modular electronics 58, for activating and deactivating the L.E.D. 42. Preferably, each one of the knobs 52, 54 and 56 is provided with appropriate click stops 60 (note FIG. 4). In the case of the adjustment knobs 52 and 54, the click stops 60 preferably are formed at every one minute of the arc, which is equivalent to about one inch at 100 yards. As regards the knob 56, its click stops indicate: OFF, HIGH and LOW.

The reflex sight 20 proper of the passive night vision reflex sight 10 preferably is contained within a baffled housing 62 so as to reduce further any potential reflections of the viewed scene by the entrance window 34 back out toward the scene, and instead to contain the transmitted beam by internal absorption within the baffles 62a. The baffled housing 62 achieves this in combination with the further window 80, which is slightly tilted downward, as already mentioned. The baffled housing 62 is mounted cantilever style, by means of a mounting arm 64, to an oblong housing 66, which replaceably contains the power source 44 (a battery pack of four 1.5 V AA batteries) at one end and the modular electronics package 58 at the other end. Access to the interior of the oblong housing 66 is via a door 68, held in place by a screw 70. The oblong housing 66 is shaped on its underside so as conveniently to mate and mount to the handle 14 of the weapon 12. The oblong housing 66 is secured to the handle 14 with the aid of a knurled knob 72. The L.E.D. 42, the reticle 46, the collimator lens 48 and the movable filter 50 are all mounted within the mounting arm 64. Turning the knob 56 to HIGH, adjusts the brightness of the pulsed or d.c. light 28 generated by the L.E.D. 42.

The baffled housing 62 at its rear near the exit window 36 preferably is provided with a demountable flared light shield 74, which can be easily slipped on or off, as desired in the field. The light shield 74, furthermore, is provided with an integrally formed flexible shutter 76, both being formed of natural or synthetic rubber or the like. The bright shield 74, together with the shutter 76, assure near perfect, if not complete, light security, i.e., no possible detection of the pulsed light 28 even from behind the rifleman. The light shield 74 and its shutter 76 are designed to be used primarily in conjunction with a night vision goggle system 16 featuring a single objective lens, as disclosed in said U.S. patent application Ser. No. 337,023. It is by pressing the single objective lens of the goggle system 16 against the shutter 76 which makes it open itself up and surrounds the now inserted objective lens thereof, effectively preventing any light from escaping from the passive night vision reflex sight 10, even toward the rear. For purposes of clarity, the shutter 76 in the FIG. 1 illustration has been omitted and the light shield 74 flared back. Preferably, the clear aperture of the passive night vision reflex sight 10, as represented by its exit window 36, is about 30 mm in diameter. The light shield 74, with its shutter 76, also serve to isolate the goggles 16 from the shock of the weapon 12 upon its firing, preventing thereby any impact from being transmitted to the rifleman.

Thus it has been shown and described a passive night vision reflex sight 10 with a wide F.O.V. and designed for attachment to a weapon 12, which passive night vision reflex sight 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A combination passive night vision reflex sight device and a photoreceptive sensor, said combination comprising:
   (a) a sight for passing an image of a scene along a line of sight, said sight including an entrance window mounted at an angle with respect to said line of sight, said angle being about 45° and a reflective film disposed on said entrance window;
   (b) said photoreceptive sensor being aligned with said line of sight and viewing said image, said photoreceptive sensor being a night vision goggle system, with daylight capability;
   (c) an exit window mounted between said entrance window and said photoreceptive sensor and normal to said line of sight;
   (d) means for generating a pulsed light and for directing it at said sight, a collimator lens and a movable filter mounted between said means for generating said pulsed light and said sight;
   (e) said sight reflecting said pulsed light into said photoreceptive sensor and superimposing it on said image;
   (f) said night vision reflex sight device characterized by having a wide field of view of about 40°;
   (g) said pulsed light being pulsed at a rate between about two to about twelve c.p.s.;
   (h) a baffled housing for said sight structured to reduce non-image reflections back toward said scene; and
   (i) a demountable flared light shield attachable to said reflex signal device about said exit window.

2. The combination of claim 1 further including a housing for said means for generating and directing said pulsed light disposed in parallel spaced relation to said baffled housing, a reticle mounted between an L.E.D. and said collimator lens within said housing for said pulsed light generating and directing means, and means for adjusting said reticle, and wherein said means for adjusting said reticle includes a pair of adjustment knobs operatively mounted on said housing for said pulsed light generating and directing means.

3. The combination of claim 2 wherein a source of power to pulse said L.E.D. is a battery pack replaceably disposed within said housing for said pulsed light generating and directing means, a modular replaceably mounted electronics within said housing for said pulsed light generating and directing means, and means for adjusting the brightness of said pulsed light, and wherein said pair of adjustment knobs are provided with click stops as a reference.

4. The combination of claim 3 wherein said sight further is provided with a magnification system, including a negative lens and a positive lens, to give the sight a magnification in the order of from about two to four, and wherein said click stops are formed at about one minute apart, with each said minute defining about one inch at 100 yards.

* * * * *